(12) United States Patent
Chen

(10) Patent No.: US 11,221,548 B2
(45) Date of Patent: Jan. 11, 2022

(54) ADJUSTABLE OPTICAL MODULE AND PROJECTOR

(71) Applicant: Coretronic Corporation, Hsin-Chu (TW)

(72) Inventor: Yii-Wen Chen, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/160,396

(22) Filed: Jan. 28, 2021

(65) Prior Publication Data

US 2021/0247669 A1    Aug. 12, 2021

(30) Foreign Application Priority Data

Feb. 7, 2020 (CN) .......................... 202010082354.0

(51) Int. Cl.
G03B 21/14 (2006.01)
G03B 21/20 (2006.01)

(52) U.S. Cl.
CPC ......... *G03B 21/142* (2013.01); *G03B 21/145* (2013.01); *G03B 21/2053* (2013.01)

(58) Field of Classification Search
CPC .... G03B 21/14; G03B 21/142; G03B 21/145; G03B 21/2053
USPC ....................................................... 353/119
See application file for complete search history.

(56) References Cited

U.S. PATENT DOCUMENTS

| | | | | |
|---|---|---|---|---|
| 2013/0308211 A1* | 11/2013 | Okada | ...................... | G03B 3/10 359/819 |
| 2020/0301118 A1* | 9/2020 | Lin | ....................... | G03B 21/142 |
| 2021/0109427 A1* | 4/2021 | Chen | ..................... | G03B 21/005 |
| 2021/0199932 A1* | 7/2021 | Chang | ...................... | G02B 5/04 |
| 2021/0223496 A1* | 7/2021 | Iinuma | ................. | H04N 5/2254 |
| 2021/0247670 A1* | 8/2021 | Chen | ...................... | G02B 7/003 |
| 2021/0294188 A1* | 9/2021 | Hsu | ........................ | G02B 7/004 |

FOREIGN PATENT DOCUMENTS

| | | |
|---|---|---|
| CN | 1834711 | 9/2006 |
| CN | 211375294 | 8/2020 |

* cited by examiner

*Primary Examiner* — William C. Dowling
(74) *Attorney, Agent, or Firm* — JCIPRNET

(57) ABSTRACT

Provided are an adjustable optical module and a projector including the same. The adjustable optical module includes an optical element; a carrier; a frame; a base; a first adjusting assembly including a first driving member, a first adjusting member, and a first rotating member; and a second adjusting assembly including a second driving member, a second adjusting member, and a second rotating member. The first adjusting member is adjusted to drive a first boss of the first driving member to move, the first rotating member being correspondingly driven to rotate, thereby pushing the carrier to rotate around a first axis relative to the base. The second adjusting member is adjusted to drive a second boss of the second driving member to move, the second rotating member being correspondingly driven to rotate, thereby pushing the frame to rotate around a second axis relative to the base.

26 Claims, 9 Drawing Sheets

ADJUSTABLE OPTICAL MODULE AND PROJECTOR

CROSS-REFERENCE TO RELATED APPLICATION

This application claims the priority benefit of China application serial no. 202010082354.0, filed on Feb. 7, 2020. The entirety of the above-mentioned patent application is hereby incorporated by reference herein and made a part of this specification.

BACKGROUND OF THE INVENTION

1. Field of the Invention

The invention relates to an optical module and a projector, and more particularly, to an adjustable optical module and projector.

2. Description of Related Art

In order to produce a specific optical effect, a designer usually configures an optical module at a specific position in an apparatus. However, if the position of the optical module cannot be adjusted, the optical effect may be affected due to a mechanism tolerance and other factors, causing optical variation.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY OF THE INVENTION

The invention is directed to an adjustable optical module that may be adjusted at an angle around two axial directions.

The invention is directed to a projector that includes the foregoing adjustable optical module.

Other objectives and advantages of the invention may be further known from technical features disclosed in the invention.

In order to achieve one, a part of, or all of the foregoing objectives, or other objectives, the adjustable optical module includes an optical element according to an embodiment of the invention, a carrier, a frame, a base, a first adjusting assembly, and a second adjusting assembly. The carrier is configured to carry the optical element. The carrier is located in the frame and is pivotally connected to the frame along a first axis. The frame is pivotally connected to the base along a second axis. The first adjusting assembly includes a first driving member, a first adjusting member, and a first rotating member. The first driving member is movably disposed on the base and includes a first boss. The first adjusting member is movably abutted against the base to drive the first driving member to move relative to the base. The first rotating member is configured to pivot relative to the base, one end of the first rotating member abutting against the first boss and the other end thereof abutting against the carrier, wherein the first adjusting member is configured to be adjusted to drive the first boss of the first driving member to move, and the first rotating member is correspondingly driven to rotate, thereby pushing the carrier to be rotated around the first axis relative to the base. The second adjusting assembly includes a second driving member, a second adjusting member, and a second rotating member. The second driving member is movably disposed on the base and includes a second boss. The second adjusting member is movably abutted against the base to drive the second driving member to move relative to the base. The second rotating member is configured to pivot relative to the base, one end of the second rotating member abutting against the second boss, and the other end thereof abutting against the frame, wherein the second adjusting member is configured to be adjusted to drive the second boss of the second driving member to move, and the second rotating member is correspondingly driven to rotate, thereby pushing the frame to be rotated around the second axis relative to the base.

A projector according to an embodiment of the invention includes a light source module, a light valve, a projection lens, and the foregoing adjustable optical module. The light source module is configured to emit an illuminating light beam. The light valve is configured to convert the illuminating light beam into an image light beam. The projection lens is configured to project the image light beam. The adjustable optical module is disposed on a path of the illuminating light beam or on a path of the image light beam.

Based on the foregoing, the first adjusting member of the first adjusting assembly of the adjustable optical module of the invention is configured to be adjusted to drive the first boss of the first driving member to move, and the first rotating member is correspondingly driven to rotate, thereby pushing the carrier, so that the carrier that carries the optical element is rotated around the first axis relative to the base. In addition, the second adjusting member of the second adjusting assembly of the adjustable optical module of the invention is configured to be adjusted to drive the second boss of the second driving member to move, and the second rotating member is correspondingly driven to rotate, thereby pushing the frame to be rotated around the second axis relative to the base. Therefore, in the adjustable optical module of the invention, when the first adjusting member and the second adjusting member are adjusted, an angle of the optical element is adjusted around two axial directions, so that a good optical effect is achieved.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
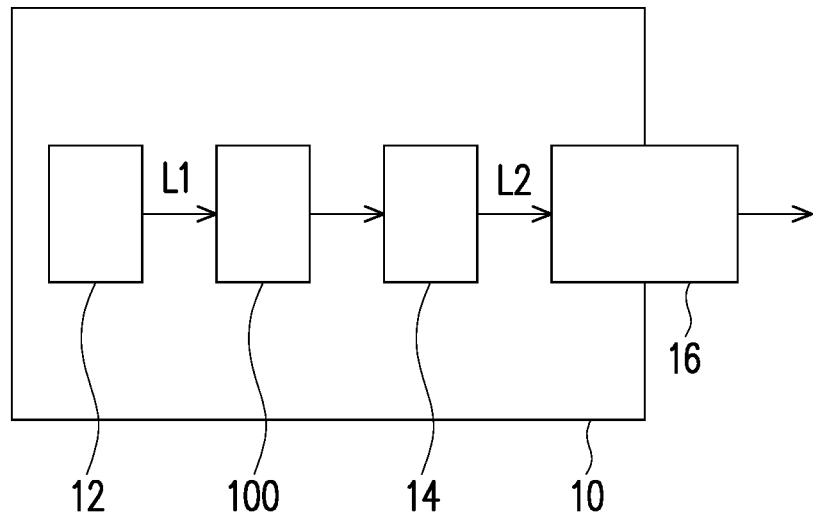
FIG. 1A is a schematic diagram of a projector according to an embodiment of the invention.

FIG. 1A is a schematic diagram of a projector according to an embodiment of the invention. Referring to FIG. 1A, a projector 10 in the embodiment includes a light source module 12, a light valve 14, a projection lens 16, and an adjustable optical module 100. The light source module 12 is configured to emit an illuminating light beam L1. In the embodiment, the light source module 12 includes, for example, a laser light source, but in other embodiments, the light source module 12 may also include a light emitting diode or other light sources. Light emitted by the light source module 12 is, for example, blue light, but may also be light beams of other colors, which is not limited in the disclosure. For example, the light source module 12 may include a plurality of laser elements (not shown), such laser elements, for example, being arranged in an array, and the laser elements, for example, being laser diodes (LD). In other embodiments, there may be a plurality of light source modules 12. In other embodiments, the light source module 12 may be, for example, a solid-state illumination source including a light emitting diode. The light source module 12 may further include other optical elements, such as a phosphor wheel and the like, and the descriptions thereof are omitted herein.

In the embodiment, the adjustable optical module 100 is disposed on a path of the illuminating light beam L1. For example, the adjustable optical module 100 is disposed between the light source module 12 and the light valve 14 to adjust a light path of the illuminating light beam L1, but a position of the adjustable optical module 100 is not limited thereto.

In the embodiment, the light valve 14 is configured to convert the illuminating light beam L1 into an image light beam L2. In the embodiment, the light valve 14 is, for example, a reflective light modulator such as a digital micro-mirror device (DMD) or a liquid crystal on silicon panel (LCoS panel). In some embodiments, the light valve 14 may be, for example, penetrated optical modulators such as a penetrated liquid crystal display panel, an electro-optic modulator, a magneto-optic modulator, and an acousto-optic modulator (AOM). However, types of the light valve 14 are not limited in the disclosure.

In the embodiment, the projection lens 16 is configured to project the image light beam L2. The projection lens 16 is located on a transmission path of the image light beam L2 and may project the image light beam L2 out of the projector 10 to display an image on a screen, a wall surface, or other projection targets. In the embodiment, the projection lens 16 includes, for example, a combination of one or more non-planar optical lenses having diopter, for example, various combinations of non-planar lenses such as a biconcave lens, a biconvex lens, a concave-convex lens, a convex-concave lens, a plano-convex lens, and a plano-concave lens. In an embodiment, the projection lens 16 may further include a planar optical lens to project the image light beam L2 from the light valve 14 out of the projector 10 in a reflective or penetrating manner. A pattern and a type of the projection lens 16 are not limited in the disclosure.

Figure 1B:
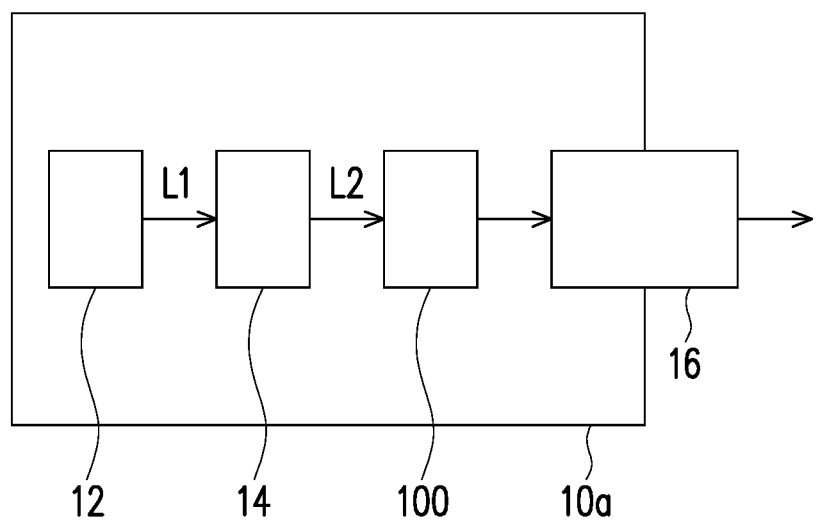
FIG. 1B is a schematic diagram of a projector according to another embodiment of the invention.

FIG. 1B is a schematic diagram of a projector according to another embodiment of the invention. Referring to FIG. 1B, a main difference between a projector 10a of FIG. 1B and the projector 10 of FIG. 1A is a position of the adjustable optical module 100. In the embodiment, the adjustable optical module 100 is disposed on a path of the image light beam L2. That is to say, the adjustable optical module 100 is disposed between the light valve 14 and the projection lens 16 to adjust an optical path of the image light beam L2.

In the foregoing embodiments, the adjustable optical module 100 may be designed to adjust an angle around two axial directions. Therefore, the adjustable optical module 100 may provide a good optical effect. The adjustable optical module 100 is described in detail below.

Figure 2:
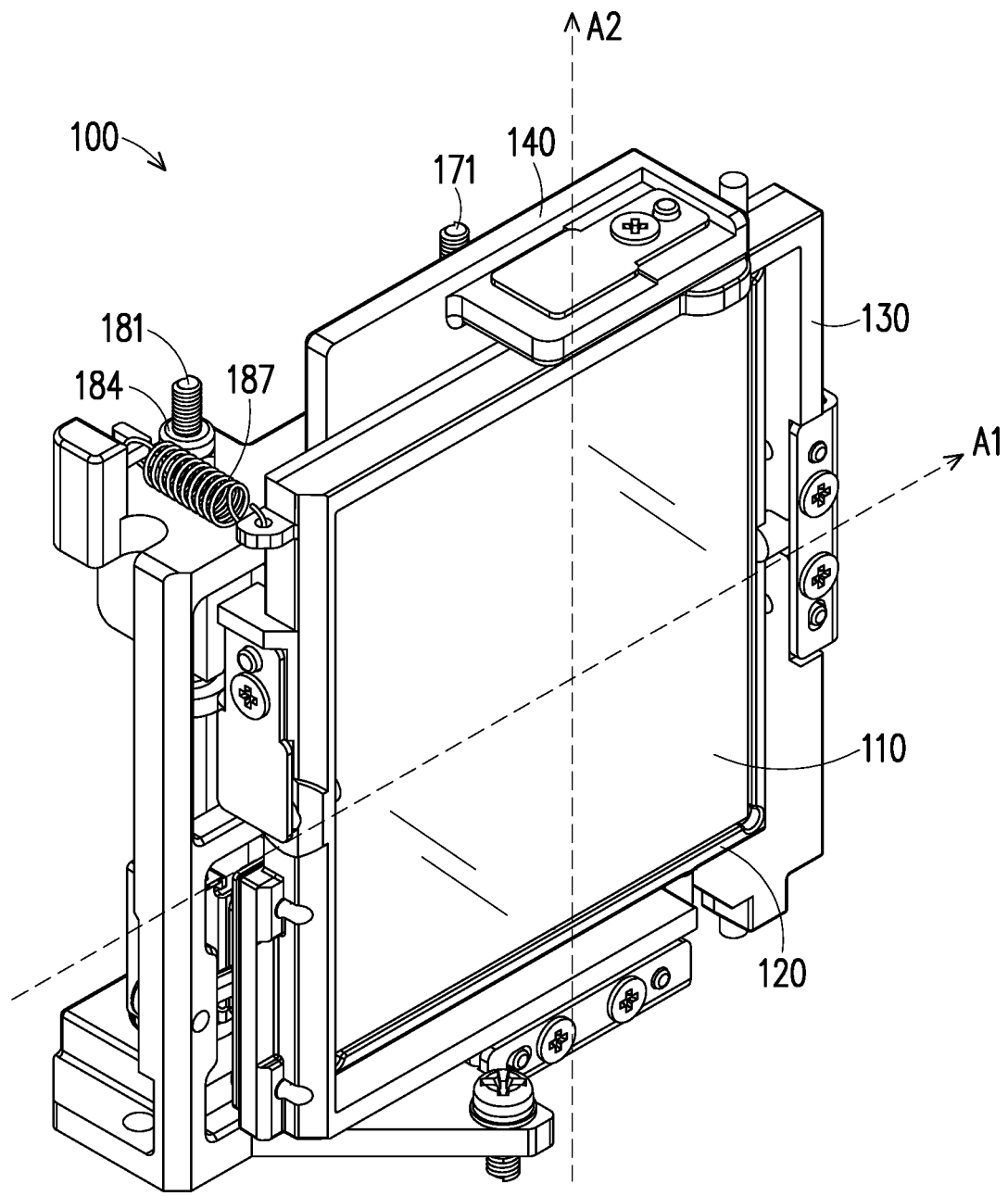
FIG. 2 to FIG. 4 are schematic diagrams of an adjustable optical module from different perspectives according to an embodiment of the invention.
Figure 3:
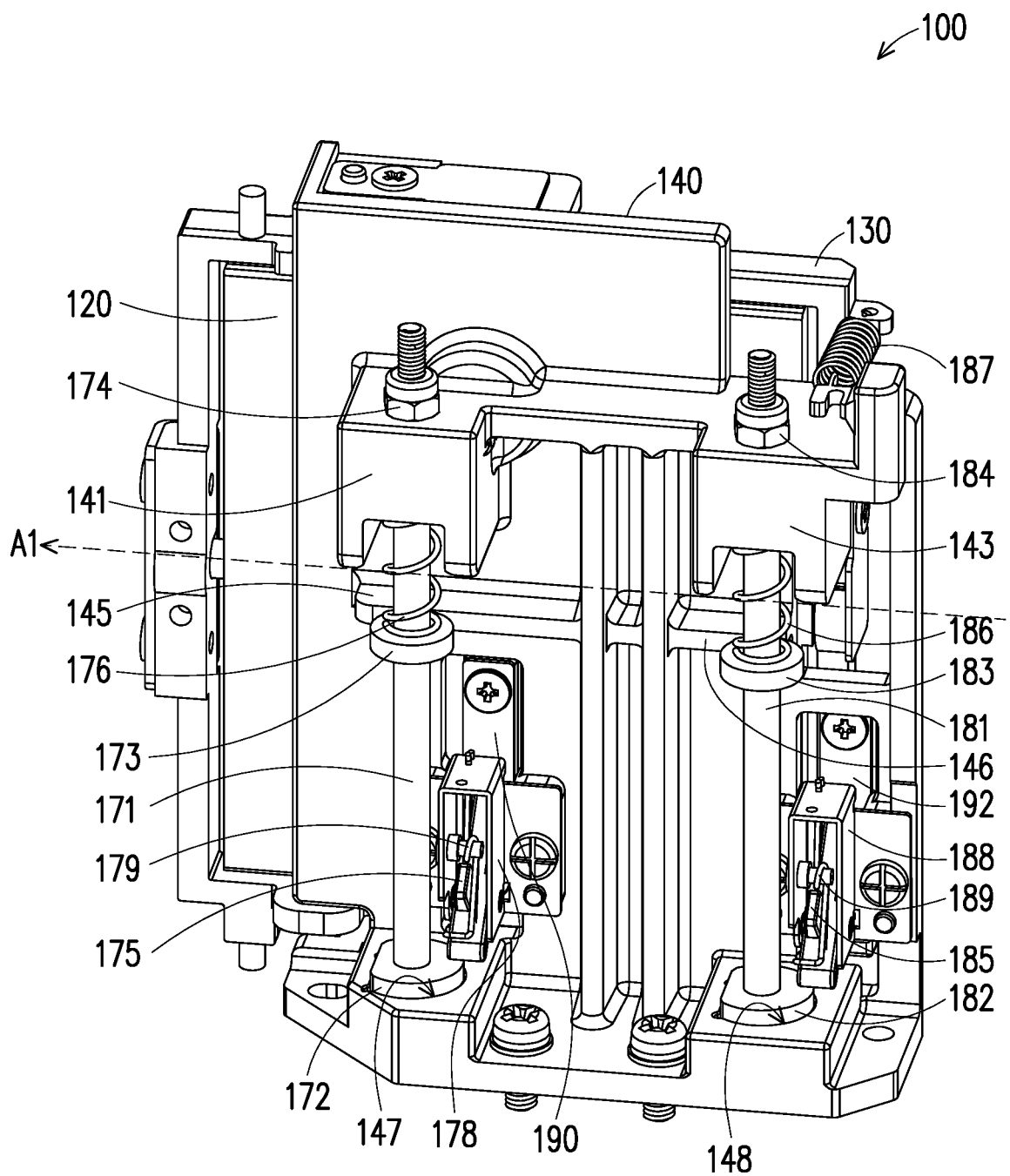
Figure 4:
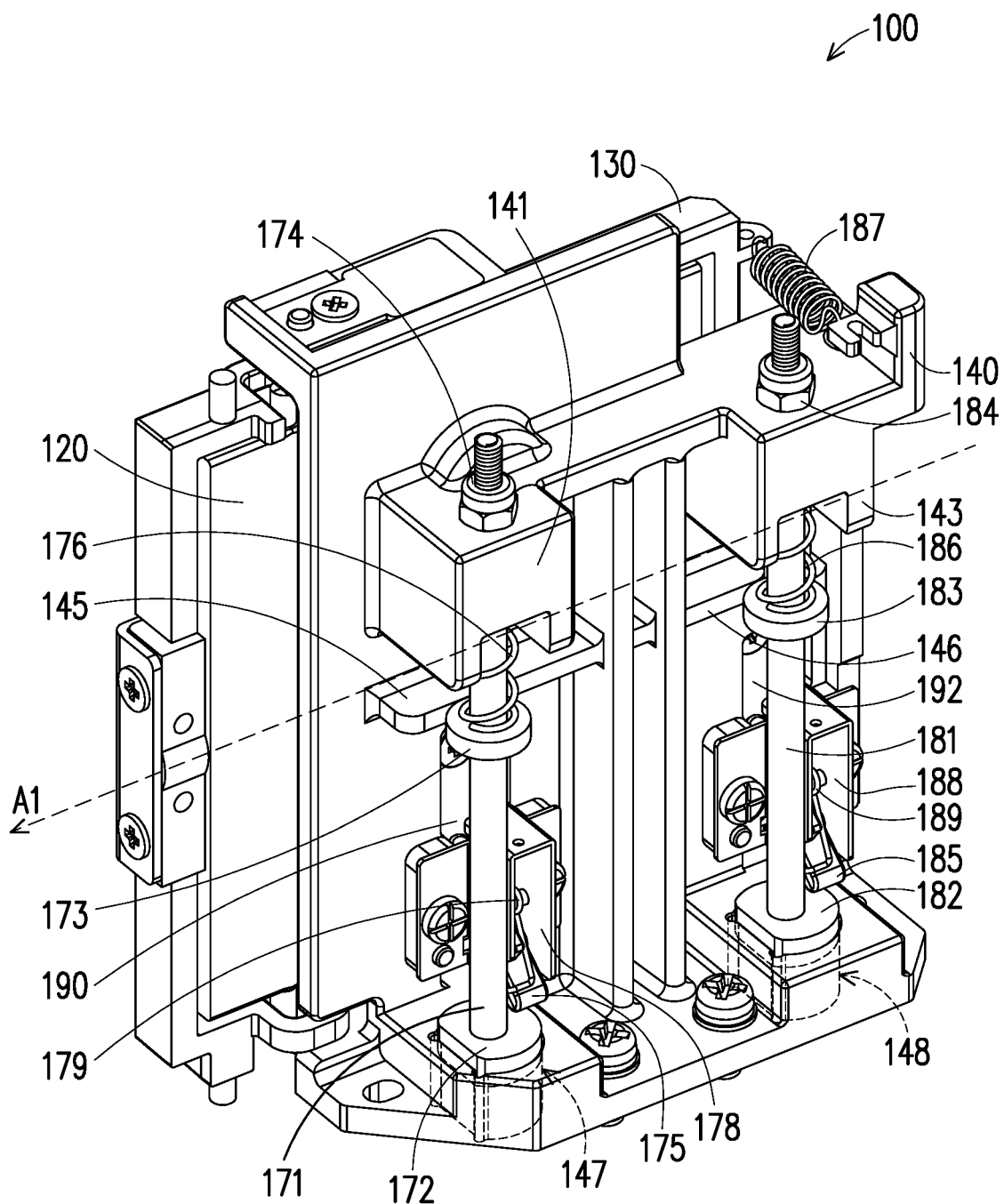
Figure 5:
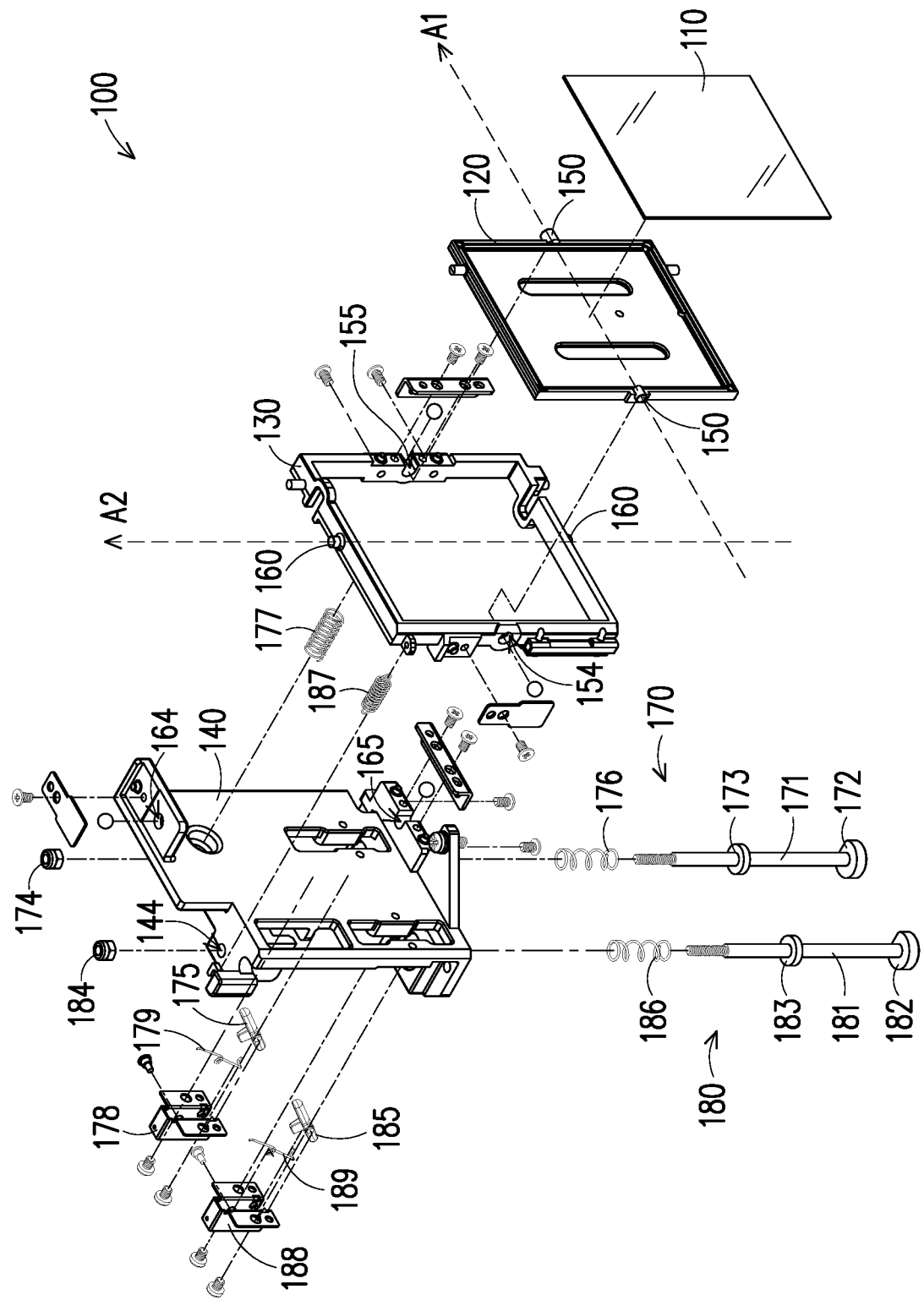
FIG. 5 is a schematic exploded diagram of the adjustable optical module of FIG. 2.
Figure 6:
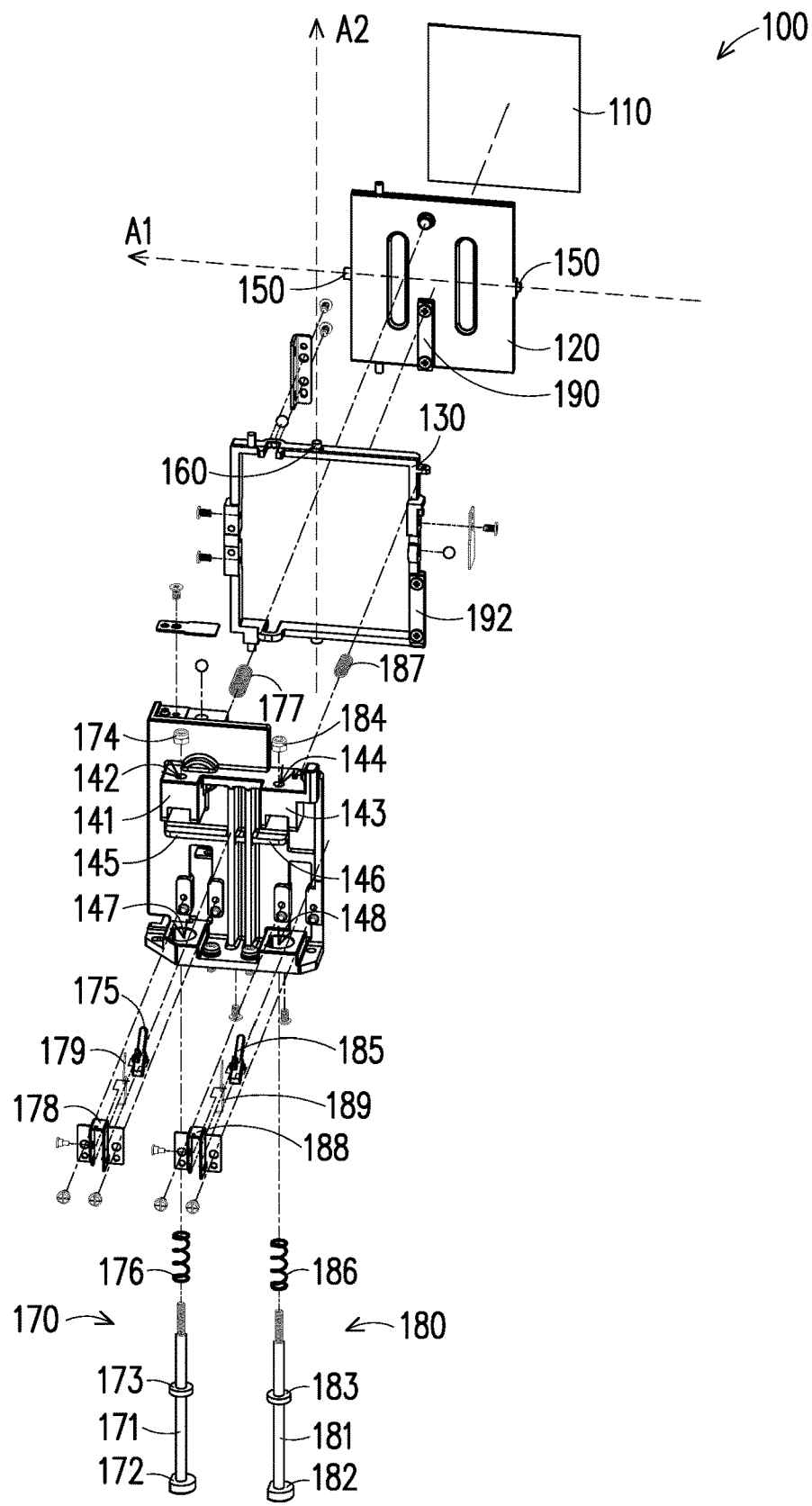
FIG. 6 is a schematic diagram of FIG. 5 from another perspective.

FIG. 2 to FIG. 4 are schematic diagrams of an adjustable optical module from different perspectives according to an embodiment of the invention. FIG. 5 is a schematic exploded diagram of the adjustable optical module of FIG. 2. FIG. 6 is a schematic diagram of FIG. 5 from another perspective. Referring to FIG. 2 to FIG. 6, the adjustable optical module 100 includes an optical element 110, a carrier 120, a frame 130, a base 140, a first adjusting assembly 170 (FIG. 5), and a second adjusting assembly 180 (FIG. 5). The optical element 110 is, for example, a lens, a dichroic mirror, or a reflecting mirror, but a type of the optical element 110 is not limited thereto.

In some embodiments, the carrier 120 is configured to carry the optical element 110. The carrier 120 is located in the frame 130 and is pivotally connected to the frame 130 along a first axis A1. As shown in FIG. 5, one of the carrier 120 and the frame 130 includes two first pivot shafts 150 protruding from both sides and extending along the first axis A1 (the two first pivot shafts 150 are located on the first axis A1, for example), and the other thereof includes two first pivot holes 154 and 155 (through hole, for example). When the carrier 120 and the frame 130 are assembled together, the two first pivot shafts 150 may be located in the two first pivot holes 154 and 155, respectively. In an embodiment shown in FIG. 5, the carrier 120 includes two first pivot shafts 150 protruding from both sides and extending along the first axis A1, and the frame 130 includes two first pivot holes 154 and 155. However, the invention is not limited thereto. In other embodiments, the frame 130 may include two first pivot shafts 150 protruding inward from both sides toward the carrier 120 and extending along the first axis A1, and the carrier 120 may include two first pivot holes 154, 155.

In the embodiment, one of the two first pivot holes 154 and 155 is an annular hole with closed edges, and the other is a horseshoe-shaped hole with non-closed edges, such as a U-shaped hole. In particular, in FIG. 5, the first pivot hole 154 on a left side of the frame 130 is an annular hole with closed edges, and the first pivot hole 155 on a right side of the frame 130 is a horseshoe-shaped hole with non-closed edges, but the invention is not limited thereto.

In the foregoing embodiment, shapes of the first pivot holes 154 and 155 are designed to allow an assembler to first insert the first pivot shaft 150 on the left side of the carrier 120 shown in FIG. 5 into the first pivot hole 154 (the annular hole) on the left side of the frame 130, and then insert the first pivot shaft 150 on the right side of the carrier 120 into the first pivot hole 155 (the horseshoe-shaped hole) on the right side of the frame 130 when assembling the carrier 120 to the frame 130, thereby increasing assembly convenience. In addition, the shapes of the first pivot holes 154 and 155 may prevent deformation of the pivot shafts due to assembly.

In addition, in the embodiment, the frame 130 is pivotally connected to the base 140 along a second axis A2. For example, one of the frame 130 and the base 140 includes two second pivot shafts 160 protruding from both sides and extending along the second axis A2 (the two second pivot shafts 160 are located on the second axis A2, for example), and the other includes two second pivot holes 164 and 165 (through hole, for example). When the frame 130 and the base 140 are assembled together, the two second pivot shafts 160 may be located in the two second pivot holes 164 and 165, respectively. In an embodiment shown in FIG. 5, the frame 130 includes two second pivot shafts 160 protruding from both sides and extending along the second axis A2, and the base 140 includes two second pivot holes 164, 165. However, the invention is not limited thereto. In other embodiments, the base 140 may include two second pivot shafts 160 protruding inwardly from both sides toward the frame 130 and extending along the second axis A2, and the frame 130 may include two second pivot hole 164, 165. Similarly, one of the two second pivot holes 164 and 165 is an annular hole with closed edges, and the other is a horseshoe-shaped hole with non-closed edges to facilitate assembly and prevent deformation of the second pivot shaft 160 during assembly. In the embodiment, the first axis A1 is perpendicular to the second axis A2.

In the embodiment, the carrier 120 carrying the optical element 110 is configured to rotate around the first axis A1 relative to the frame 130 and to rotate around the second axis A2 relative to the base 140, so as change angles along the first axis A1 and the second axes A2. Next, the first adjusting assembly 170 configured to rotate the carrier 120 around the first axis A1 relative to the frame 130 and the second adjusting assembly 180 configured to rotate the carrier 120 and the frame 130 around the second axis A2 relative to the base 140.

Figure 7:
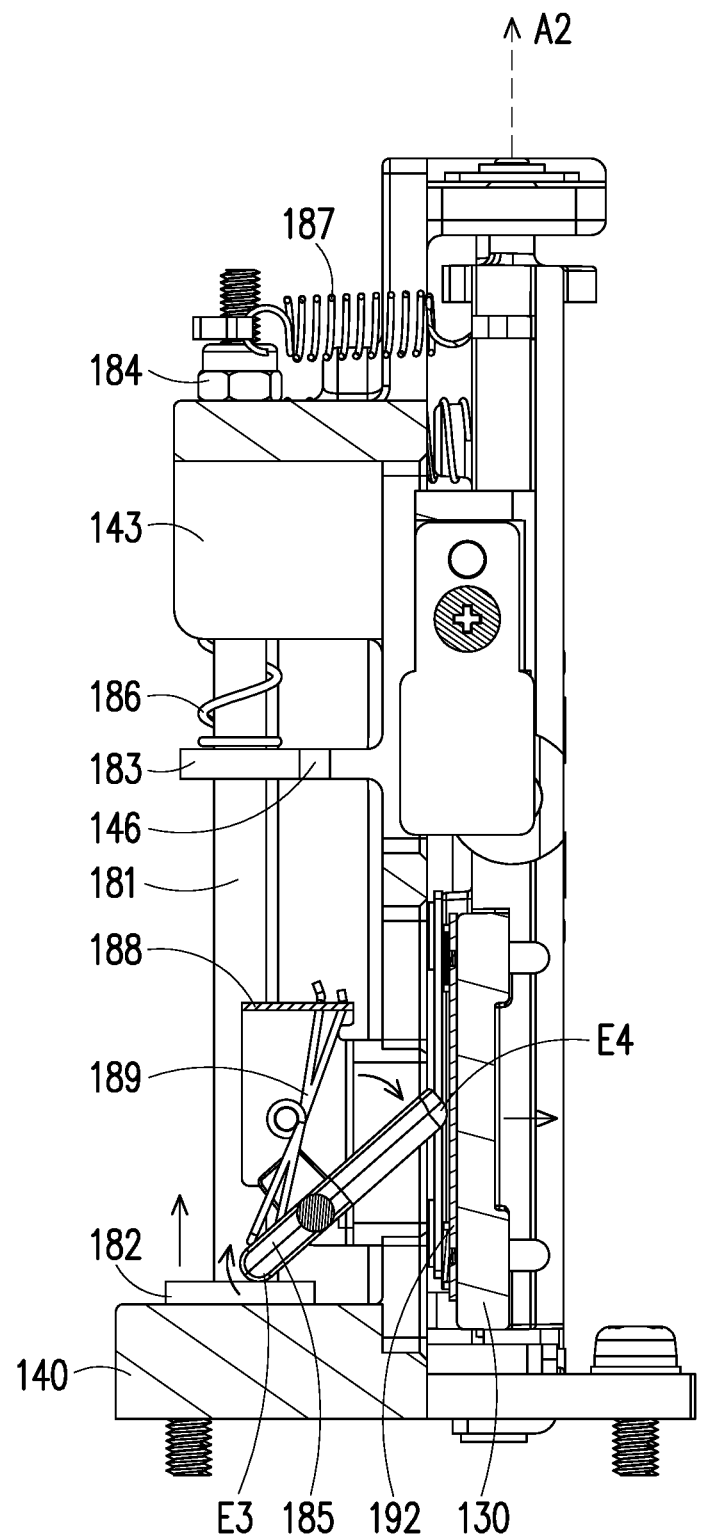
FIG. 7 to FIG. 9 are schematic sectional diagrams of the adjustable optical module of FIG. 2.
Figure 8:
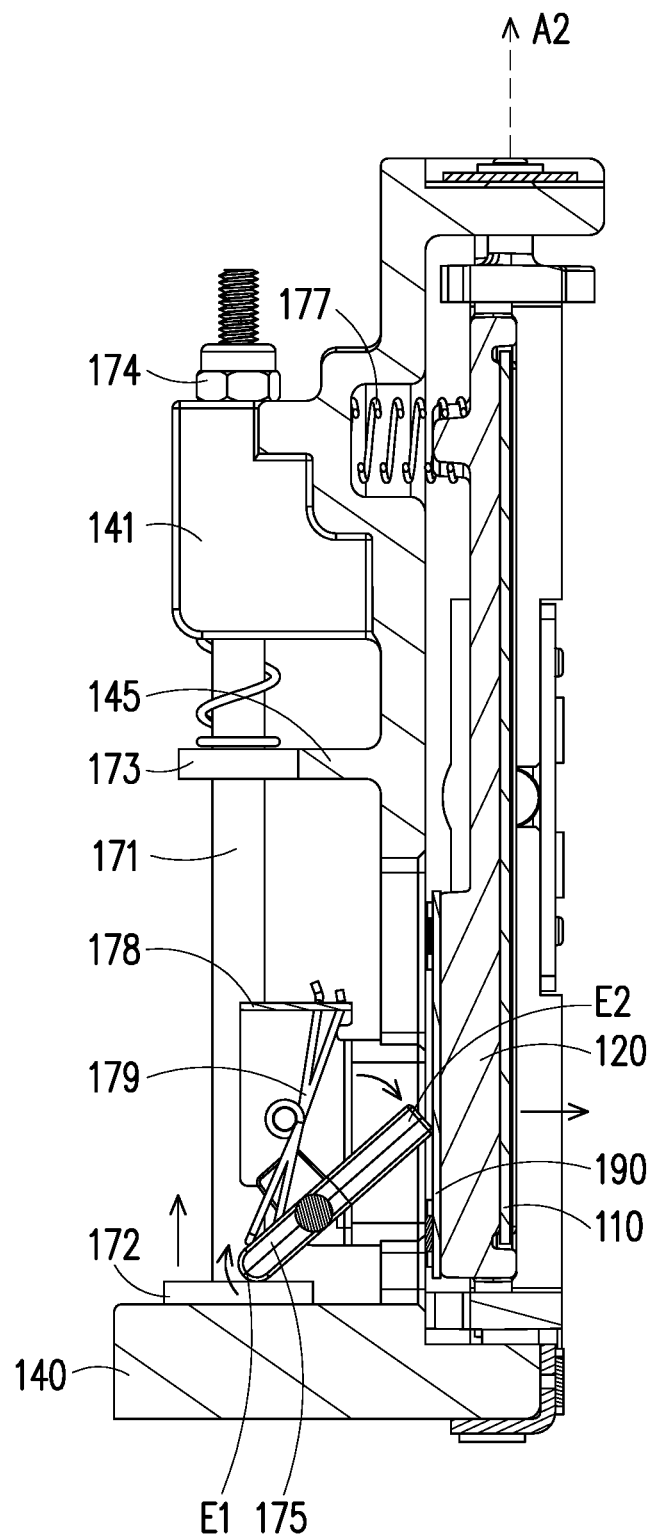
Figure 9:
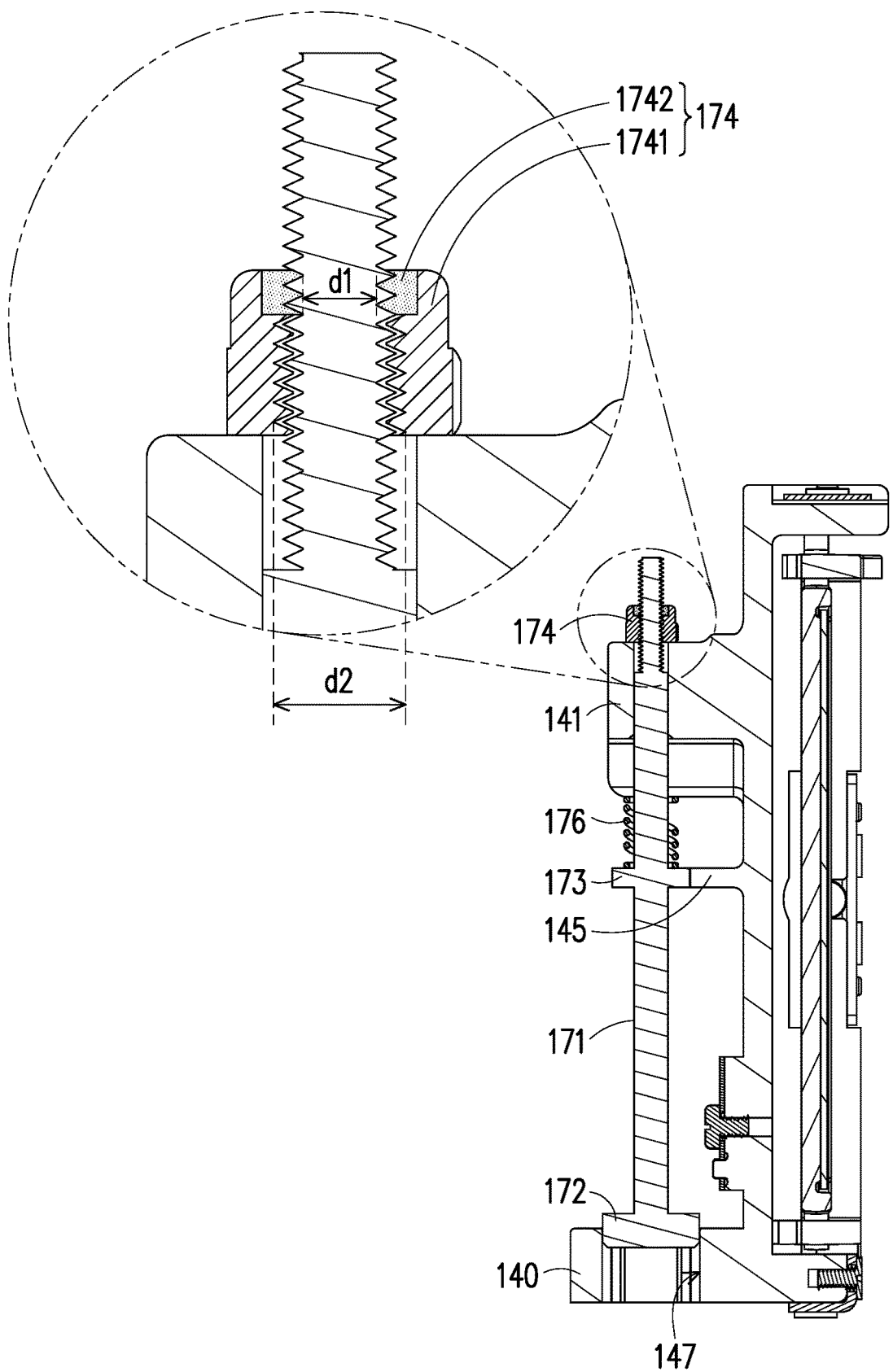

FIG. 7 to FIG. 9 are schematic sectional diagrams of the adjustable optical module of FIG. 2. Referring to FIG. 4 to FIG. 6, FIG. 8, and FIG. 9, in the embodiment, the first adjusting assembly 170 (FIG. 5) includes a first driving member 171, a first adjusting member 174, and a first rotating member 175. The first driving member 171 is movably disposed on the base 140 and includes a first boss 172. The base 140 includes a first guide hole 147 (FIG. 6), the first boss 172 extending into the first guide hole 147, and an outer contour of the first boss 172 corresponding to an inner contour of the first guide hole 147. In the embodiment, a shape of the first guide hole 147 is a circle with a flat side (FIG. 4). More particular, a shape of the first guide hole 147 is a combination of a circular arc and a chord. Such a design may prevent the first boss 172 of the first driving member 171 from rotating in the first guide hole 147 of the base 140, and enable the first driving member 171 to move up and down relative to the base 140. Definitely, in other embodiments, the shape of the first guide hole 147 may be a polygon.

In the embodiment, the first adjusting member 174 is movably abutted against the base 140 to drive the first driving member 171 to move relative to the base 140 in a direction parallel to the second axis A2. In the embodiment, the first driving member 171 is a screw rod, the first adjusting member 174 is a nut, the first driving member 171 passes through the base 140, the first adjusting member 174 abuts against the base 140, and the first adjusting member 174 is threadedly connected to the first driving member 171. Therefore, when a user rotates the first adjusting member 174, the first adjusting member 174 is rotated and causes the first driving member 171 to move up and down in a direction parallel to the second axis A2. Definitely, types of the first driving member 171 and the first adjusting member 174 are not limited thereto.

In the embodiment, the base 140 further includes a first abutting portion 141. The first abutting portion 141 includes a first through hole 142 (FIG. 6). The first driving member 171 passes through the base 140 by passing through the first through hole 142. The first driving member 171 includes a first limiting portion 173. When the first driving member 171 is assembled on the base 140, the first limiting portion 173 of the first driving member 171 is aligned with the first abutting portion 141 of the base 140. As shown in FIG. 3 to FIG. 6, the first adjusting assembly 170 further includes a first elastic member 176. The first elastic member 176 is disposed between the first abutting portion 141 of the base 140 and the first limiting portion 173 of the first driving member 171. In the embodiment, the first elastic member 176 may be configured to stabilize the first driving member 171, thereby preventing the first driving member 171 from undesirably shaking when the first driving member moves up and down in the first through hole 142 of the base 140.

It may be seen from FIG. 3, FIG. 4, FIG. 6, and FIG. 8 that, in some embodiments, the base 140 includes a first alignment identifying portion 145 that is aligned with the first limiting portion 173 of the first driving member 171 and configured to assist in positioning the first limiting portion 173. For example, the first driving member 171 may be adjusted first, so that the first limiting portion 173 is aligned with the first alignment identifying portion 145, and then other adjustments are performed.

In the embodiment, the first rotating member 175 is configured to pivot relative to the base 140. More particular, as shown in FIG. 5, the first adjusting assembly 170 further includes a first housing base 178 and a first torsion spring 179. The first housing base 178 may be fixed to the base 140, the first rotating member 175 is pivotally connected to the first housing base 178, and the first torsion spring 179 is connected between the first housing base 178 and the first rotating member 175. The first rotating member 175 includes a rotation protruding shaft, and the first housing base 178 includes a corresponding rotation hole. The rotation protruding shaft of the first rotating member 175 is rotated in the rotation hole of the first housing base 178, so that the first rotating member 175 is rotated relative to the first housing base 178.

It may be seen from FIG. 8 that one end E1 (a lower left end) of the first rotating member 175 abuts against the first boss 172 of the first driving member 171, and the other end E2 (an upper right end) abuts against the carrier 120. When the first adjusting member 174 is adjusted (rotated), the first boss 172 of the first driving member 171 may be driven to move up and down in a direction parallel to the second axis A2. The end E1 of the first rotating member 175 rises or falls together with the first boss 172 by abutting against the first boss 172. Because the first rotating member 175 is pivotally connected to the first housing base 178, when the end E1 of the first rotating member 175 rises or falls, the other end E2 correspondingly falls or rises, so that the first rotating member 175 may rotate around the rotation protruding shaft of the first rotating member 175 relative to the first housing base 178, thereby pushing the carrier 120 to rotate around the first axis A1 relative to the base 140.

As shown in FIG. 5, the first adjusting assembly 170 further includes a third elastic member 177 disposed between the carrier 120 and the base 140. For example, one end of the third elastic member 177 may have a hook (not shown), and the corresponding base 140 has a hook link (not shown). The third elastic member 177 is connected to the base 140 through the hook and the hook link. In addition, the other end of the third elastic member 177 may abut against and be in contact with the carrier 120. In the embodiment, the third elastic member 177 is a compression spring. It is worth mentioning that it may be seen from FIG. 6 that the third elastic member 177 and the first rotating member 175 are located on upper and lower sides of the first pivot shaft 150, respectively. When the first driving member 171 shown in FIG. 8 moves upward to cause the first rotating member 175 to be rotated clockwise so as to push the carrier 120, the carrier 120 is rotated counterclockwise. In this case, the third elastic member 177 is compressed to accumulate elastic potential. Conversely, when the first driving member 171 moves downward, the third elastic member 177 releases the accumulated elastic potential, so that the carrier 120 is rotated clockwise. In other words, the carrier 120 is rotated around the first axis A1 relative to the base 140 through rotation of the first rotating member 175 and pushing and abutting of the third elastic member 177.

It is worth mentioning that, in the embodiment, the adjustable optical module 100 may further optionally include a first resistance reducing member 190. The first resistance reducing member 190 is fixed to one side that is of the carrier 120 and that faces the base 140. Surface roughness of the first resistance reducing member 190 is smaller than surface roughness of the carrier 120. The end E2 of the first rotating member 175 pushes the carrier 120 by abutting against the first resistance reducing member 190 to reduce friction, so that the carrier 12 is rotated smoothly.

Referring to FIG. 4 to FIG. 6, FIG. 8, and FIG. 9, in the embodiment, the second adjusting assembly 180 includes a second driving member 181, a second adjusting member 184, and a second rotating member 185. The second driving member 181 is movably disposed on the base 140 and includes a second boss 182. In the embodiment, the base 140 includes a second guide hole 148 (FIG. 6), the second boss 182 extending into the second guide hole 148, and an outer contour of the second boss 182 corresponding to an inner contour of the second guide hole 148. In the embodiment, a shape of the second guide hole 148 is a circle with a flat side (FIG. 4). Further, a shape of the second guide hole 148 may be a combination of a circular arc and a chord or is a polygon. Such a design may prevent the second boss 182 of the second driving member 181 from rotating in the second guide hole 148 of the base 140, and enable the second driving member 181 to move up and down relative to the base 140.

In the embodiment, the second adjusting member 184 is movably abutted against the base 140 to drive the second driving member 181 to move relative to the base 140 in a direction parallel to the second axis A2. In the embodiment, the second driving member 181 is a screw rod, the second adjusting member 184 is a nut, the second driving member 181 passes through the base 140, the second adjusting member 184 abuts against the base 140, and the second adjusting member 184 is threadedly connected to the second driving member 181. Therefore, when a user rotates the second adjusting member 184, the second adjusting member 184 is rotated to drive the second driving member 181 to move up and down in a direction parallel to the second axis A2. Definitely, types of the second driving member 181 and the second adjusting member 184 are not limited thereto.

In the embodiment, the base 140 further includes a second abutting portion 143. The second abutting portion 143 includes a second through hole 144 (FIG. 6). The second driving member 181 passes through the base 140 by passing through the second through hole 144. The second driving member 181 includes a second limiting portion 183. When the second driving member 181 is assembled on the base 140, a second limiting portion 1833 of the second driving member 181 is aligned with the second abutting portion 143 of the base 140. As shown in FIG. 3 to FIG. 6, the second adjusting assembly 180 further includes a second elastic member 186. The second elastic member 186 is disposed between the second abutting portion 143 of the base 140 and the second limiting portion 183 of the second driving member 181. In the embodiment, the second elastic member 186 may be configured to stabilize the second driving member 181, thereby preventing the second driving member 181 from undesirably shaking when the second driving member moves up and down in the second through hole 144 of the base 140.

It may be seen from FIG. 3, FIG. 4, FIG. 6, and FIG. 7 that, in some embodiments, the base 140 includes a second alignment identifying portion 146 that is aligned with the second limiting portion 183 of the second driving member 181 and configured to assist in positioning the second limiting portion 183. For example, the second driving member 181 may be adjusted first, so that the second limiting portion 183 is aligned with the second alignment identifying portion 146 and is then adjusted.

In the embodiment, the second rotating member 185 is configured to pivot relative to the base 140. More particular, as shown in FIG. 5, the second adjusting assembly 180 further includes a second housing base 188 and a second torsion spring 189. The second housing base 188 is fixed to the base 140, the second rotating member 185 is pivotally connected to the second housing base 188, and the second torsion spring 189 is connected between the second housing base 188 and the second rotating member 185. The second rotating member 185 includes a rotation protruding shaft, and the second housing base 188 includes a corresponding rotation hole. The rotation protruding shaft of the second rotating member 185 is rotated in the rotation hole of the second housing base 188, so that the second rotating member 185 is rotated relative to the second housing base 188.

As shown in FIG. 7, one end E3 (a lower left end) of the second rotating member 185 abuts against the second boss 182 of the second driving member 181, and the other end E4 (an upper right end) abuts against the frame 130. When the second adjusting member 184 is adjusted (rotated), the second boss 182 of the second driving member 181 may be driven to move up and down in a direction parallel to the second axis A2. The end E3 of the second rotating member 185 rises or falls together with the second boss 182 by abutting against the second boss 182. Because the second rotating member 185 is pivotally connected to the second housing base 188, when the end E3 of the second rotating member 185 rises or falls, the other end E4 correspondingly falls or rises, so that the second rotating member 185 may rotate around the rotation protruding shaft of the second rotating member 185 relative to the second housing base 188, thereby pushing the frame 130 to rotate around the second axis A2 relative to the base 140.

In the embodiment, as shown in FIG. 5, the second adjusting assembly 180 further includes a fourth elastic member 187 disposed between the frame 130 and the base 140. For example, one end of the fourth elastic member 187 may have a hook, and the corresponding base 140 has a hook link. The fourth elastic member 187 is connected to the base 140 through the hook and the hook link. For another example, the other end of the fourth elastic member 187 may abut against and be in contact with the frame 130. In the embodiment, the fourth elastic member 187 is a compression spring. It is worth mentioning that it may be seen from FIG. 6 that the fourth elastic member 187 and the second rotating member 185 are both located on a right side of the second pivot shaft 160 of the frame 130. When the second driving member 181 shown in FIG. 7 moves upward to rotate the second rotating member 185 clockwise to push the frame 130, the frame 130 is rotated around the second axis A2 (a portion that is of the frame 130 and that is pushed by the second rotating member 185 is rotated toward a direction away from the second housing base 188). In this case, the fourth elastic member 187 is stretched to accumulate elastic potential. Conversely, when the second driving member 181 moves downward, the fourth elastic member 187 releases the accumulated elastic potential, enabling the frame 130 to rotate around the second axis A2 in a reverse direction (a portion that is of the frame 130 and that is pushed by the second rotating member 185 is rotated toward a direction close to the second housing base 188). In other words, the frame 130 is rotated around the second axis A2 relative to the base 140 through rotation of the second rotating member 185 and pushing and abutting of the fourth elastic member 187.

In the embodiment, the adjustable optical module 100 may further optionally include a second resistance reducing member 192. The second resistance reducing member 192 is fixed to a side that is of the frame 130 that faces the base 140. Surface roughness of the second resistance reducing member 192 is smaller than surface roughness of the frame 130. The end E4 of the second rotating member 185 pushes the frame 130 by abutting against the second resistance reducing member 192 to reduce a friction, so that the frame 130 is rotated smoothly.

It is worth mentioning that, as shown in FIG. 9, in the embodiment, at least one of the first adjusting member 174 and the second adjusting member 184 may be an embedded nylon nut. Taking the first adjusting member 174 as an example, the embedded nylon nut includes a nut body 1741 and a nylon backing ring 1742 embedded in the nut body 1741. An inner diameter d1 of the nylon backing ring 1742 is less than an inner diameter d2 of an internal thread of the nut body 1741. Because an inner side of the nut body 1741 has a nylon backing ring 1742, when the first driving member 171 is engaged with the first adjusting member 174, a screw thread of the first driving member 171 may be engaged (firmly) with the nylon backing ring 1742 to cause resistance, so that the nut may be prevented from getting loose. Therefore, after the adjustable optical module 100 is adjusted, it is not necessary to perform glue fixing at a gap between the first adjusting member 174 and the first driving member 171.

Based on the foregoing, the first adjusting member of the first adjusting assembly of the adjustable optical module of the invention is configured to be adjusted to drive the first boss of the first driving member to move, and the first rotating member is correspondingly driven to rotate, thereby pushing the carrier, so that the carrier that carries the optical element is rotated around the first axis relative to the base. In addition, the second adjusting member of the second adjusting assembly of the adjustable optical module of the invention is configured to be adjusted to drive the second boss of the second driving member to move, and the second rotating member is correspondingly driven to rotate, thereby pushing the frame to be rotated around the second axis relative to the base. Therefore, in the adjustable optical module of the invention, when the first adjusting member and the second adjusting member are adjusted, an angle of the optical element is adjusted around two axial directions, so that a good optical effect is achieved.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. An adjustable optical module, comprising an optical element, a carrier, a frame, a base, a first adjusting assembly, and a second adjusting assembly, wherein
the carrier is configured to carry the optical element;
the carrier is located in the frame and is pivotally connected to the frame along a first axis;
the frame is pivotally connected to the base along a second axis;
the first adjusting assembly comprises a first driving member, a first adjusting member, and a first rotating member, wherein
the first driving member is movably disposed on the base, and the first driving member comprises a first boss;
the first adjusting member is movably abutted against the base to drive the first driving member to move relative to the base; and
the first rotating member is configured to pivot relative to the base, one end of the first rotating member abutting against the first boss and the other end thereof abutting against the carrier, wherein the first adjusting member is configured to be adjusted to drive the first boss of the first driving member to move, and the first rotating member is correspondingly driven to rotate, thereby pushing the carrier to be rotated around the first axis relative to the base; and
the second adjusting assembly comprises a second driving member, a second adjusting member, and a second rotating member, wherein
the second driving member is movably disposed on the base, and the second driving member comprises a second boss;
the second adjusting member is movably abutted against the base to drive the second driving member to move relative to the base; and
the second rotating member is configured to pivot relative to the base, one end of the second rotating member abutting against the second boss and the other end thereof abutting against the frame, wherein the second adjusting member is configured to be adjusted to drive the second boss of the second driving member to move, and the second rotating member is correspondingly driven to rotate, thereby pushing the frame to be rotated around the second axis relative to the base.

2. The adjustable optical module according to claim 1, wherein
the first driving member and the second driving member are two screw rods, and the first adjusting member and the second adjusting member are two nuts, wherein the first driving member and the second driving member pass through the base, and the first adjusting member and the second adjusting member abut against the base, and
the first adjusting member and the second adjusting member are threadedly connected to the first driving member and the second driving member, respectively.

3. The adjustable optical module according to claim 2, wherein the two nuts are two embedded nylon nuts, each of the embedded nylon nuts comprising a nut body and a nylon backing ring embedded in the nut body, wherein an inner diameter of the nylon backing ring is less than an inner diameter of an inner thread of the nut body.

4. The adjustable optical module according to claim 1, wherein
the base comprises a first abutting portion and a second abutting portion, the first abutting portion comprising a first through hole, and the second abutting portion comprising a second through hole, wherein
the first driving member and the second driving member pass through the first through hole and the second through hole, respectively,
the first driving member comprises a first limiting portion located beside the first abutting portion,
the second driving member comprises a second limiting portion located beside the second abutting portion,
the first adjusting assembly further comprises a first elastic member, the first elastic member being disposed between the first abutting portion and the first limiting portion, and
the second adjusting assembly further comprises a second elastic member, the second elastic member being disposed between the second abutting portion and the second limiting portion.

5. The adjustable optical module according to claim 4, wherein the base comprises a first alignment identifying portion corresponding to the first limiting portion and a second alignment identifying portion corresponding to the second limiting portion.

6. The adjustable optical module according to claim 1, wherein the first adjusting assembly further comprises a third elastic member disposed between the carrier and the base, and the second adjusting assembly further comprises a fourth elastic member disposed between the frame and the base.

7. The adjustable optical module according to claim 6, wherein the third elastic member is a compression spring, wherein
the carrier comprises a first pivot shaft extending along the first axis, and the frame comprises a first pivot hole, the first pivot shaft passing through the first pivot hole; and
the carrier is rotated around the first axis relative to the base through rotation of the first rotating member and pushing and abutting of the third elastic member.

8. The adjustable optical module according to claim 6, wherein the fourth elastic member is a compression spring, wherein
the frame comprises a second pivot shaft extending along the second axis, and the base comprises a second pivot hole, the second pivot shaft passing through the second pivot hole; and
the frame is rotated around the second axis relative to the base through rotation of the second rotating member and pushing and abutting of the fourth elastic member.

9. The adjustable optical module according to claim 1, wherein the base comprises a first guide hole and a second guide hole,
the first boss and the second boss extend into the first guide hole and the second guide hole, respectively, and outer contours of the first boss and the second boss correspond to inner contours of the first guide hole and the second guide hole.

10. The adjustable optical module according to claim 9, wherein a shape of one of the first guide hole and the second guide hole is a circle with a flat side.

11. The adjustable optical module according to claim 9, wherein a shape of one of the first guide hole and the second guide hole is a shape formed by a combination of an arc and a chord or is a polygon.

12. The adjustable optical module according to claim 1, further comprising a first resistance reducing member and a second resistance reducing member, wherein
the first resistance reducing member is fixed to one side that is of the carrier and that faces the base, surface roughness of the first resistance reducing member being smaller than surface roughness of the carrier, and the other end of the first rotating member pushing the carrier by abutting against the first resistance reducing member; and
the second resistance reducing member is fixed to one side that is of the frame and that faces the base, surface roughness of the second resistance reducing member being smaller than surface roughness of the frame, and the other end of the second rotating member pushing the frame by abutting against the second resistance reducing member.

13. The adjustable optical module according to claim 1, wherein the first adjusting assembly further comprises a first housing base and a first torsion spring, the first housing base being fixed to the base, the first rotating member being pivotally connected to the first housing base, and the first torsion spring being connected between the first housing base and the first rotating member, and
the second adjusting assembly further comprises a second housing base and a second torsion spring, the second housing base being fixed to the base, the second rotating member being pivotally connected to the second housing base, and the second torsion spring being connected between the second housing base and the second rotating member.

14. A projector, comprising a light source module, a light valve, a projection lens, and an adjustable optical module, wherein
the light source module is configured to emit an illuminating light beam;
the light valve is configured to convert the illuminating light beam into an image light beam;
the projection lens is configured to project the image light beam; and
the adjustable optical module is disposed on a path of the illuminating light beam or a path of the image light beam, and the adjustable optical module comprises an optical element, a carrier, a frame, a base, a first adjusting assembly, and a second adjusting assembly, wherein
the carrier is configured to carry the optical element;
the carrier is located in the frame and is pivotally connected to the frame along a first axis;
the frame is pivotally connected to the base along a second axis;
the first adjusting assembly comprises a first driving member, a first adjusting member, and a first rotating member, wherein
the first driving member is movably disposed on the base, and the first driving member comprises a first boss;
the first adjusting member is movably abutted against the base to drive the first driving member to move relative to the base; and
the first rotating member is configured to pivot relative to the base, one end of the first rotating member abutting against the first boss and the other end thereof abutting against the carrier, wherein the first adjusting member is configured to be adjusted to drive the first boss of the first driving member to move, and the first rotating member is correspondingly driven to rotate, thereby pushing the carrier to be rotated around the first axis relative to the base; and
the second adjusting assembly comprises a second driving member, a second adjusting member, and a second rotating member, wherein
the second driving member is movably disposed on the base, and the second driving member comprises a second boss;
the second adjusting member is movably abutted against the base to drive the second driving member to move relative to the base; and
the second rotating member is configured to pivot relative to the base, one end of the second rotating member abutting against the second boss and the other end thereof abutting against the frame, wherein the second adjusting member is configured to be adjusted to drive the second boss of the second driving member to move, and the second rotating member is correspondingly driven to rotate, thereby pushing the frame to be rotated around the second axis relative to the base.

15. The projector according to claim 14, wherein
the first driving member and the second driving member are two screw rods, and the first adjusting member and the second adjusting member are two nuts, wherein
the first driving member and the second driving member pass through the base, and the first adjusting member and the second adjusting member abut against the base, and
the first adjusting member and the second adjusting member are threadedly connected to the first driving member and the second driving member, respectively.

16. The projector according to claim 15, wherein the two nuts are two embedded nylon nuts, each of the embedded nylon nuts comprising a nut body and a nylon backing ring embedded in the nut body, wherein an inner diameter of the nylon backing ring is less than an inner diameter of an inner thread of the nut body.

17. The projector according to claim 14, wherein the base comprises a first abutting portion and a second abutting portion, the first abutting portion comprising a first through hole, and the second abutting portion comprising a second through hole, wherein
the first driving member and the second driving member pass through the first through hole and the second through hole, respectively,
the first driving member comprises a first limiting portion located beside the first abutting portion,
the second driving member comprises a second limiting portion located beside the second abutting portion, the first adjusting assembly further comprises a first elastic member, the first elastic member being disposed between the first abutting portion and the first limiting portion, and the second adjusting assembly further comprises a second elastic member, the second elastic member being disposed between the second abutting portion and the second limiting portion.

18. The projector according to claim 17, wherein the base comprises a first alignment identifying portion corresponding to the first limiting portion and a second alignment identifying portion corresponding to the second limiting portion.

19. The projector according to claim 14, wherein the first adjusting assembly further comprises a third elastic member disposed between the carrier and the base, and the second adjusting assembly further comprises a fourth elastic member disposed between the frame and the base.

20. The projector according to claim 19, wherein the third elastic member is a compression spring, wherein the carrier comprises a first pivot shaft extending along the first axis, and the frame comprises a first pivot hole, the first pivot shaft passing through the first pivot hole; and the carrier is rotated around the first axis relative to the base through rotation of the first rotating member and pushing and abutting of the third elastic member.

21. The projector according to claim 19, wherein the fourth elastic member is a compression spring, wherein the frame comprises a second pivot shaft extending along the second axis, and the base comprises a second pivot hole, the second pivot shaft passing through the second pivot hole; and the frame is rotated around the second axis relative to the base through rotation of the second rotating member and pushing and abutting of the fourth elastic member.

22. The projector according to claim 14, wherein the base comprises a first guide hole and a second guide hole, the first boss and the second boss extend into the first guide hole and the second guide hole, respectively, and outer contours of the first boss and the second boss correspond to inner contours of the first guide hole and the second guide hole.

23. The projector according to claim 22, wherein a shape of one of the first guide hole and the second guide hole is a circle with a flat side.

24. The projector according to claim 22, wherein a shape of one of the first guide hole and the second guide hole is a shape formed by a combination of an arc and a chord or is a polygon.

25. The projector according to claim 14, wherein the adjustable optical module further comprises a first resistance reducing member and a second resistance reducing member, wherein the first resistance reducing member is fixed to one side that is of the carrier and that faces the base, surface roughness of the first resistance reducing member being smaller than surface roughness of the carrier, and the other end of the first rotating member pushing the carrier by abutting against the first resistance reducing member; and the second resistance reducing member is fixed to one side that is of the frame and that faces the base, surface roughness of the second resistance reducing member being smaller than surface roughness of the frame, and the other end of the second rotating member pushing the frame by abutting against the second resistance reducing member.

26. The projector according to claim 14, wherein the first adjusting assembly further comprises a first housing base and a first torsion spring, the first housing base being fixed to the base, the first rotating member being pivotally connected to the first housing base, and the first torsion spring being connected between the first housing base and the first rotating member, and the second adjusting assembly further comprises a second housing base and a second torsion spring, the second housing base being fixed to the base, the second rotating member being pivotally connected to the second housing base, and the second torsion spring being connected between the second housing base and the second rotating member.

* * * * *